United States Patent
Araujo et al.

(10) Patent No.: US 11,720,667 B2
(45) Date of Patent: Aug. 8, 2023

(54) STATEFUL MICROSERVICE-AWARE INTRUSION DETECTION

(71) Applicant: International Business Machines Corporation, Armonk, NY (US)

(72) Inventors: Frederico Araujo, White Plains, NY (US); William Blair, Brighton, MA (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 17/216,215

(22) Filed: Mar. 29, 2021

(65) Prior Publication Data
US 2022/0309152 A1  Sep. 29, 2022

(51) Int. Cl.
*G06F 21/54* (2013.01)
*G06F 21/55* (2013.01)
*G06F 21/56* (2013.01)

(52) U.S. Cl.
CPC ............ *G06F 21/54* (2013.01); *G06F 21/554* (2013.01); *G06F 21/566* (2013.01); *G06F 2221/033* (2013.01)

(58) Field of Classification Search
CPC ...... G06F 21/54; G06F 21/554; G06F 21/566; G06F 2221/033; G06F 2221/034
See application file for complete search history.

(56) References Cited

U.S. PATENT DOCUMENTS

| | | | |
|---|---|---|---|
| 2016/0080399 A1* | 3/2016 | Harris | H04L 63/1433 726/23 |
| 2016/0253232 A1* | 9/2016 | Puri | H04L 63/1425 714/37 |
| 2016/0371489 A1* | 12/2016 | Puri | G06F 16/254 |
| 2017/0083701 A1 | 3/2017 | Tajalli et al. | |

(Continued)

OTHER PUBLICATIONS

Patwardhan, Aditi A., "Security-Aware Program Visualization for Analyzing In-Lined Reference Monitors," Thesis, The University of Texas at Dallas, 2010, 71 pages.

(Continued)

*Primary Examiner* — Paule Callahan
(74) *Attorney, Agent, or Firm* — Rachel M. Yadlosky

(57) ABSTRACT

A method, system, and computer program product for performing microservice-aware reference policy checking that accept stateful security policies. The method may include receiving a security policy for a container that is part of a microservice architecture. The method may also include obtaining a first effect graph of the security policy, resulting in a security model for the container. The method may also include identifying execution behavior of the container. The method may also include generating a second effect graph of the execution behavior of the container, where the generating includes summarizing operations and interactions between entities in the execution behavior and results in a behavioral model. The method may also include comparing the behavioral model to the security model. The method may also include determining whether the container has deviated from the security policy based on the comparing. The method may also include enforcing the security policy against the container.

20 Claims, 9 Drawing Sheets

(56) References Cited

U.S. PATENT DOCUMENTS

2018/0046798 A1  2/2018  Zeller et al.
2020/0218798 A1  7/2020  Kosaka et al.

OTHER PUBLICATIONS

Azarmi, Mehdi, "End-to-End Security in Service-Oriented Architecture," Thesis, Purdue University, Apr. 2016, Open Access Dissertations, 165 pages.
Patil et al., "Inline Application Firewall for Container Workloads," IP.Com, IP.com No. IPCOM000252797D, IP. com Electronic Publication Date: Feb. 12, 2018, Copyright: Copyright 2018 Cisco Systems, Inc., 9 pages.
"On Chip and Off-Core Engine Based Dynamically Programmable Trigger for Advanced Processor Performance Analysis," IP.Com, IP.com No. IPCOM000257920D, IP.com Electronic Publication Date: Mar. 23, 2019, 6 pages.
Chari et al., "BlueBoX: A policy-driven, host-based intrusion detection system," ACM Transactions on Information and System Security (TISSEC), May 2003, Abstract Only, pp. 173-200.
Egele et al. "Using static program analysis to aid intrusion detection," International Conference on Detection of Intrusions and Malware, and Vulnerability Assessment, Springer, Berlin, Heidelberg, 2006, Abstract Only, pp. 17-36.
Hamlen et al., "Certified in-lined reference monitoring on .NET," Proceedings of the 2006 workshop on Programming languages and analysis for security, 2006, 11 pages.
Michael et al., "Using finite automata to mine execution data for intrusion detection: A preliminary report," Springer, International Workshop on Recent Advances in Intrusion Detection, Berlin, Heidelberg, 2000, Abstract Only, pp. 66-79.
Schneider, "Enforceable security policies," ACM Transactions on Information and System Security (TISSEC), vol. 3, No. 1, Feb. 2000, Abstract Only, 6 pages.
Lee et al., "A data mining framework for building intrusion detection models," IEEE, Proceedings of the 1999 IEEE Symposium on Security and Privacy (Cat. No. 99CB36344), 1999, 13 pages.
Hamlen et al., "Aspect-oriented in-lined reference monitors," ACM, Proceedings of the third ACM SIGPLAN workshop an Programming languages and analysis for security, Jun. 2008, 10 pages.
Mell et al., "The NIST Definition of Cloud Computing, Recommendations of the National Institute of Standards and Technology," US Department of Commerce, Special Publication 800-145, Sep. 2011, 7 pages.

\* cited by examiner

STATEFUL MICROSERVICE-AWARE INTRUSION DETECTION

BACKGROUND

The present disclosure relates to intrusion detection systems and, more specifically, to performing microservice-aware reference policy checking through intrusion detection systems.

Host-based intrusion detection is the examination and monitoring of various programs and applications to determine whether there is any behavior that is abnormal from the reference policy. Each program may have a reference policy that shows the normal behavior and operation of the program, and the intrusion detector may help catch when the program is behaving differently than their reference policy. Determining when the program is not following the reference policy helps detect any malicious activity or policy violations for the program. For instance, if the program is not following their reference policy, then the program may have a virus, bug, worm, or other malware and/or security issues. In some instances, an intrusion detection system (IDS) performs the reference monitoring, leveraging an operating system kernel to implement a non-repudiable enforcement of a reference policy. Once an abnormality has been detected (i.e., behavior different from the reference policy), the IDS may report the behavior, send an alarm, terminate an application, or any other action that helps prevent the spread of the potentially malicious activity.

SUMMARY

The present invention provides a computer-implemented method, system, and computer program product to perform microservice-aware reference policy checking that accept stateful security policies. The method may include receiving a security policy for a container that is part of a microservice architecture. The method may also include obtaining a first effect graph of the security policy, resulting in a security model for the container. The method may also include identifying execution behavior of the container. The method may also include generating a second effect graph of the execution behavior of the container, where the generating includes summarizing operations and interactions between entities in the execution behavior and results in a behavioral model for the container. The method may also include comparing the behavioral model to the security model. The method may also include determining whether the container has deviated from the security policy based on the comparing. The method may also include enforcing the security policy against the container. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
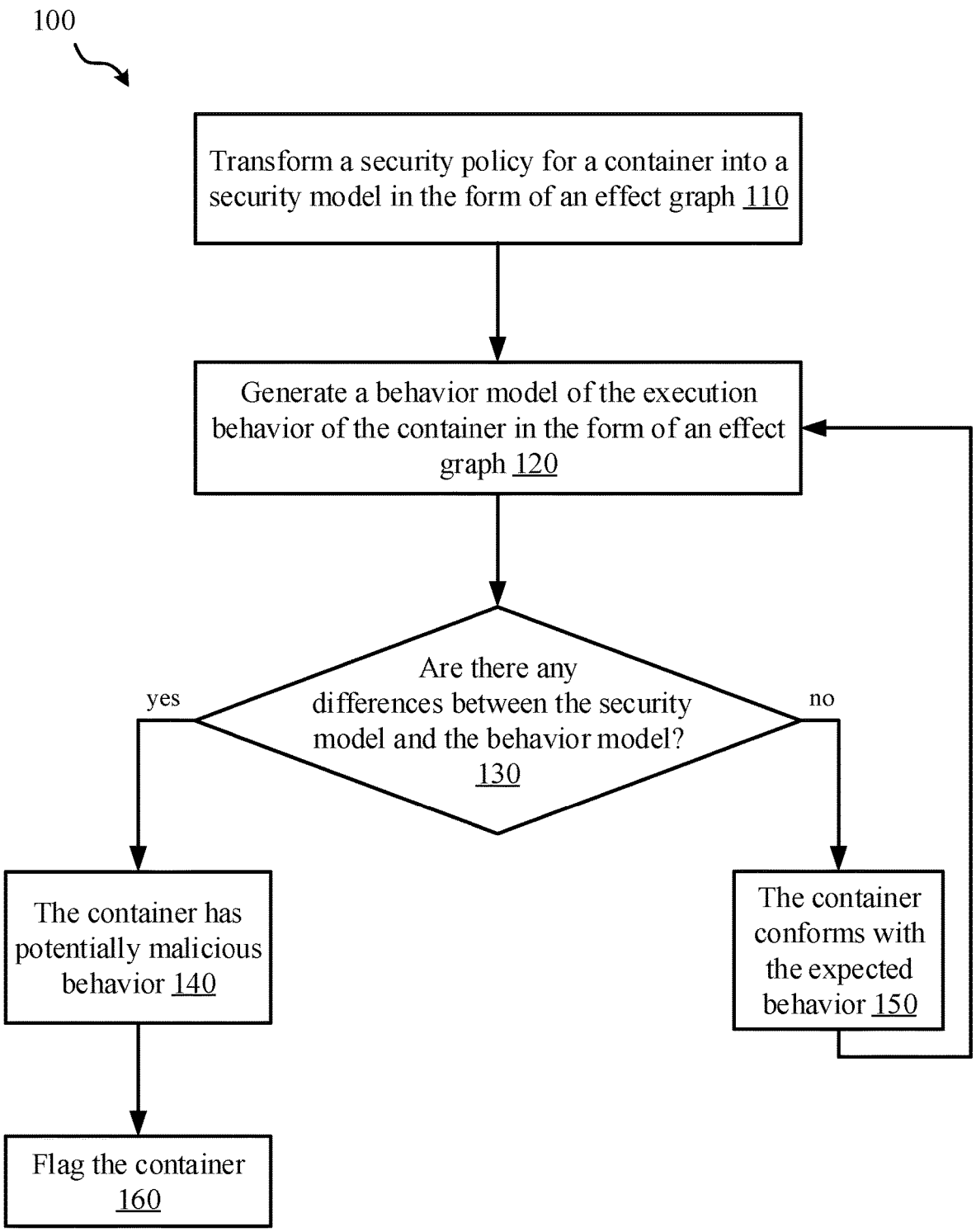
FIG. 1 depicts a flowchart of a set of operations for performing microservice-aware intrusion detection, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to intrusion detection systems and, more specifically, to performing microservice-aware reference policy checking through intrusion detection systems. While the present disclosure is not necessarily limited to such applications, various aspects of the disclosure may be appreciated through a discussion of various examples using this context.

Microservices, or a microservice architecture, in cloud computing, may include application components that are separated into various containers. Put differently, microservices may include container cloud workloads, with the workloads in the various containers making up an application. These containers may be managed throughout various computing nodes in order to streamline the application components. Breaking up an application into microservices, or containers of workloads, may make it easier to analyze and understand the application, as each section (e.g., container) can be analyzed separately from the other sections of the application. However, even though it may be easier to understand the application and analyze it, the complexity of the administration for the application may increase because there are a plurality of microservices to manage and administer, instead of a single application. Therefore, conventional methods of reference modeling may be difficult (or in some instances, may not work) because each microservice is monitored, as opposed to the application as a whole. Specifically, conventional intrusion detection systems have not been adapted for use with microservices where individual nodes host a plurality of different workloads in various containers. Additionally, conventional intrusion detection typically uses stateless policies (for instance, policies that have no reference or connection to previous data), as stateful security policies (for instance, policies that can be returned to and have connection to previous data and transactions) may impose large performance penalties compared to the stateless policies.

The present disclosure provides a computer-implemented method, system, and computer program product for performing microservice-aware intrusion detection that accepts stateful security policies. For instance, a microservice-aware intrusion detection system (MIDS) may be used to monitor container workloads and information in order to detect whether there are any abnormalities in the container's performance (for example, compared to the reference policy). An MIDS (for example, MIDS 250 (FIG. 2)) may be an intrusion detection system that is designed to perform reference policy checking for microservices, or container cloud workloads. In some instances, the MIDS may be a host-based IDS that is deployed alongside a container in a cloud computing environment. In some instances, each container may have a corresponding MIDS. In some instances, the MIDS may be deployed as an intrusion detector that enforces a reference policy leveraging non-repudiable kernel mechanisms, such as various forms of mandatory access control and secure computation.

The MIDS may monitor the effects of executing the microservices in order to detect deviations or abnormalities from normal behavior. In these instances, as each container of the microservices may be monitored, the normal behavior may be demonstrated through an effect graph of the reference policy for a corresponding container. In some embodiments, an effect graph may be a directed graph G that summarizes the admissible sequences of observable effects that a program can generate during execution. In one specific embodiment, $G=<V, E, E\rightarrow\{(v1, v2)|(v1, v2)\epsilon V2\}>$, where the pair $<pc, r>\epsilon V$ is a node encoding a program state (including the program counter and register values r used as parameters to system calls), and id$\epsilon$E is a labeled edge representing an observed system call. This effect graph may therefore describe a finite automaton that can be used as a reference security policy for detecting unintended program behaviors.

The normal/expected behavior of the container may be compared to the current behavior of the container to determine whether there are any unexpected actions of the container. To compare the two, the current behavior of the container may also be demonstrated through an effect graph so that it can be easily compared to the effect graph of the normal/expected behavior. If there are any differences between the two effect graphs (i.e., the effect graph of the normal/expected behavior and the effect graph of the current behavior), then the portion of the application that is in the container is not behaving as it should, and the container may have an abnormality, virus, or other malicious activity.

Figure 2:
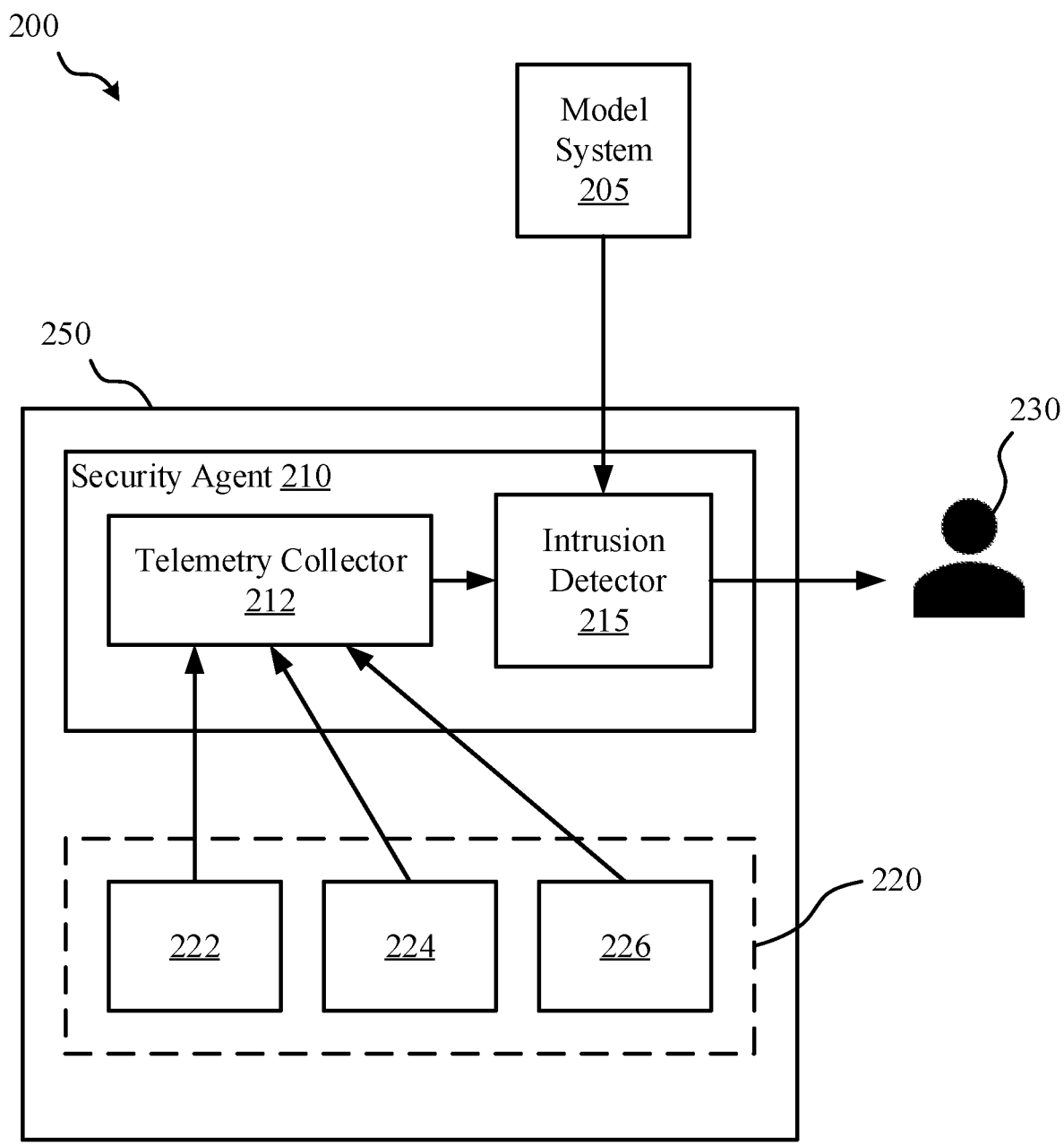
FIG. 2 depicts a schematic diagram of a microservice-aware intrusion detection system environment, according to some embodiments.

Referring now to FIG. 1, a flowchart illustrating a method 100 for performing microservice-aware intrusion detection is depicted, according to some embodiments. In some embodiments, method 100 is executed by a server (e.g., computer system/server 702 (FIG. 7)) on or connected to a computer system (e.g., computer system 700 (FIG. 7)). In some embodiments, the method 100 is implemented as a computer script or computer program (e.g., computer executable code) to be executed on or connected to the computer system. In some embodiments, method 100 is executed on a computer system within a cloud computing environment (e.g., cloud computing environment 50 (FIG. 8)). In some embodiments, method 100 is executed on a microservice-aware intrusion detection system (MIDS) such as MIDS 250 (FIG. 2).

Method 100 includes operation 110 to transform a security policy for a container into a security model in the form of an effect graph. A reference policy may show the normal behavior and operation of a program or application. A security policy, as referred to herein, may be a reference policy for a corresponding container (for instance, that houses a workload or other component of an application). The security policy for each microservices container for an application may be obtained using conventional methods (for example, static analysis or domain engineering). In some embodiments, the security policy for a container is generated by an MIDS. In some embodiments, the security policy for a container is generated on a separate system, component, and/or device and is transmitted (for example, over a network) to the MIDS. Once the MIDS has received (for example, via network or internally) the security policy for its corresponding container, the security policy may be transformed into an effect graph.

In some embodiments, an effect graph (as referred to herein) is a directed graph and/or abstraction that summarizes all the interactions the portion of the program (for example, the workload) has with its environment. These interactions are sequences of observable effects that the portion of the program may generate during execution. The effect graph may be an abstraction of these effects. Effect graphs are discussed further herein and depicted in FIG. 5 and FIG. 6.

In some embodiments, transforming the security policy for the container into the effect graph may include identifying the expected observable effects and interactions of the container (or the workload or portion of the program/application within the container). Put more simply, the expected behaviors of the container, or how the container should behave and interact, may be identified. The expected observable effects of the container may include expected entities, events, and flows of the container. Entities of the container may be resources and/or components that are on the container, or that the container interacts with, such as (for example) processes, files, etc. Events of the container may be the specific behaviors and operations of the container (for example, process, exec, file delete, etc.). In some instances, events may be the operations that occur between entities. Flows may be summarizations of a set of operations and/or the interactions between the entities. In some instances, an event and a flow may be substantially similar. For instance, an event may be a single occurrence of an operation and a flow may be a plurality of occurrences of an operation. For example, if a node is cloned, the node may be the entity, the operation of cloning may be an event, and the multiple read and write interactions to a common file descriptor may be denoted by a flow to a third node corresponding to that file (the third node being an entity). In some instances, multiple events may be aggregated into a single flow. For example, the two nodes (the original node and the clone node) may be able to both read and write data between them (for instance, concurrently). Instead of having two separate events for each node's interaction with the file node, one to show the interactions between the two nodes when reading data between them and one to show the interactions for reading data from the file and one to show the interactions for writing data to the file, there may be a single flow between the nodes (and, in some instances, a file node) that represents both reading and writing interactions. In some instances, the flow may also summarize statistics about each operation within the flow.

In some embodiments, the expected events and the expected flows may be synthesized to have minimal flows between the entities of the container. For example, the security policy may determine that connect, read, write, and close events are expected between two entities (for example, a node and a socket). Instead of having four different flows between the entities (i.e., one for connect interactions, one for read interactions, one for write interactions, and one for close interactions) or even two to three flows between entities (for example, if the read and write interactions and/or the connect and close interactions were already aggregated into single flows), the flows and events may be synthesized so that there is a single flow between the two entities that represents connect, read, write, and close interactions.

The expected events, entities, and flows (for instance, in their synthesized form) may then be generated into an effect graph format. For example, vertices may be used to represent the entities and the synthesized flows and events may be represented as edges. The effect graph of the security policy may be referred to herein as a security model.

Method 100 includes operation 120 to generate a behavior model of the execution behavior of the container in the form of an effect graph. Once there is an effect graph of the security policy (i.e., a security model) that shows the expected entities, events, and flows of the container (for instance, in a synthesized form), the actual behavior of the container may be compared to the security model to see if they are the same. In some instances, the behavioral model may be generated prior to the actual execution of the container and, once the container is executed, it's behavior may be continuously compared to the behavioral model.

In some embodiments, in order to compare the actual behavior of the container to the behavior model of the expected behavior, the actual behavior may need to be converted into an effect graph format so that it is easily comparable. In some embodiments, generating an effect graph of the actual execution behavior includes synthesizing the behavior into minimal flows between entities (similar to the synthesizing that may occur when transforming the security policy into the security model) and the synthesized behavior may be converted into an effect graph. Generating an effect graph of the execution behavior of the container (i.e., generating a behavioral model for the container) is discussed further herein in relation to FIG. 3, FIG. 4, FIG. 5, and FIG. 6.

Method 100 includes operation 130 to determine whether there are any differences between the security model and the behavior model. When the expected behavior of the model and the actual behavior of the model are both in their effect graph forms (i.e., the security model and the behavior model), the two graphs can be compared to determine whether there are any differences between the two. In some instances, if there is a single difference between the models, the method 100 proceeds to operation 140. For example, a security model (i.e., the effect graph of the expected behavior/security policy of the container) may show that the container is expected to have two entities (a node and a socket) and the node and the socket are expected to perform accept, read, write, and close events between them (for example, shown by a single flow between the entities). However, in this example, the behavior model (i.e., the effect graph of the actual behavior of the container) may show that the container has the two entities (the node and the socket) and a single synthesized flow between the entities—which is all consistent with the security model—but, the node and the socket may actually be performing connect, read, write, and close events between them. Because the connect event and the accept event are different, in this example, there is a difference between the expected behavior of the container and its actual behavior, therefore the container is behaving abnormally.

If there are differences between the two models (in operation 130), method 100 includes operation 140 where it is determined that the container has potentially malicious behavior. When there are one or more differences between the security model and the behavior model, the container is behaving abnormally, which may be an indication that there is an anomaly in the container and the container may have a virus or other malicious behavior. When the container has potentially malicious behavior, method 100 proceeds to operation 160 and flags the container. In some instances, the difference(s) between the security model and the behavior model may not end up being due to malicious behavior, and there may not be any security issues for the container. However, because there is the potential for malicious behavior, the container is flagged and then the system may follow the security protocols or policies of the system in order to further investigate and determine whether the container is compromised and has malicious activity.

If there are not any differences between the two models (in operation 130), method 100 proceeds to operation 150 where it is determined that the container is conforming with the expected behavior. When all of the entities, events, and flows that are expected for the container (shown in the security model) are the same as the entities, events, and flows that are actually occurring for the container (shown in the behavioral model), then the container is behaving as expected and there is likely no malicious activity on the container. When the container is conforming with its expected behavior, the container may continue executing as usual.

Even though the container may currently be conforming with the expected behavior, the container may be continuously monitored to check for potential malicious activity. For example, a container at a first time may be conforming with expected behavior, but at a second time later than the first time the container may have been infected with a virus. Therefore, after operation 150, method 100 may return back to operation 120 and generate a new behavior model showing the behavior of the container. This process may repeat until possible malicious behavior is detected (for example, operation 140, due to differences between the security model and the behavior model, in operation 130) and/or until the container is done executing.

Synthesizing the expected flows and events of the container and generating effect graphs of the synthesized behaviors may help simplify the amount of behaviors that need to be compared when performing intrusion detection for the application, which helps achieve reference policy checking for each container and microservice without using too much bandwidth or overworking the system, and without sacrificing accuracy of the intrusion detection. For instance, conventional intrusion detection may be performed on the application as a whole. In a microservice architecture, all the various application components and/or workloads are separated into various containers. If conventional intrusion detection methods were used on each container, the system may be overworked and/or there may not be enough bandwidth because there may be too many behaviors and too many containers that are being analyzed at a same/similar time. By using an MIDS and creating effect graphs of both the security policy and the execution behavior of the container (forming the behavioral model and the security model), the security policy and execution behavior are represented in relatively simple forms, which may make it easier for the system to compare the two and determine whether the container is acting unexpectedly. Therefore, even though the reference policy evaluation may occur individually for each container of the microservice architecture, instead of an application as a whole, the computer may not be overworked because the intrusion detection for each container may be simpler for the computer than conventional intrusion detection processes. Additionally, the reference policy evaluation may be more accurate because it is done for each container and component of the application, instead of simply for the application as a whole.

Referring to FIG. 2, a schematic diagram of a microservice-aware intrusion detection system (MIDS) environment 200 is depicted, according to some embodiments. The MIDS environment 200 includes a model system 205, an MIDS 250, and a user 230. The model system 205 may be the system and/or component that generates the security policy for the container. In some embodiments, the model system 205 is separate from the MIDS 250 (as depicted) and may communicate with the MIDS 250 over a network. In some embodiments, not depicted, the model system 205 may be a component on the MIDS 250. In some embodiments, the MIDS 250 is deployed alongside a container in a cloud computing environment (for example cloud computing environment 50 (FIG. 8)). In some embodiments, each container has a corresponding MIDS 250.

MIDS 250 is an intrusion detection system that performs reference policy checking for a container. MIDS 250 includes a security agent 210 and workloads 222, 224, 226 (referred to collectively as workloads 220). This is exemplary, and an MIDS 250 may include any number of workloads that are part of a container. For example, a container may only include one workload and therefore MIDS 250 may only have a single workload. In another example, a container may include five workloads, therefore MIDS 250 may have five workloads.

Security agent 210 may be a component of the MIDS 250 that collects the actual behavior of the container, compacts or synthesizes it, and determines whether the behavior of the container matches the expected behavior in the security policy (for example, from the model system 205). The entities, events, and flows of the workloads 220 (referred to collectively as the system calls of the workloads 220 and/or container) may have various orders, times, and other specifics when they are actually being executed. However, for the purposes of intrusion detection for the container and determining whether the container is acting abnormally, the orders, times, and other specifics may not have much effect on determining whether the container has malicious activity and may utilize extra bandwidth (and possibly risk overworking the computer) to consider these specifics when performing referencing monitoring for the container.

In MIDS 200, security agent 210 includes a telemetry collector 212 and an intrusion detector 215. Telemetry is the collection of data, behaviors, actions, etc. In this instance, telemetry is the collection of the behavioral data from the workloads 220. In some embodiments, the behavior of each of the workloads 220 may be sent as a telemetry stream to the telemetry collector. The telemetry collector 212 may convert the telemetry stream into a compact format (for instance, a SysFlow stream) so that the unnecessary specifics of the behavior of the workloads 220 is not considered when performing the reference intrusion detection (to help improve the performance of the system and prevent the system from being overworked). SysFlow is a framework that is used to represent the activities and calls of a system in a reduced format that focuses on how various processes and operations relate. Therefore, in some embodiments, the telemetry collector 212 may use a SysFlow framework to represent the behaviors of the workloads 220. The SysFlow framework is discussed further herein and depicted in FIG. 3.

In some embodiments, the compact telemetry stream is a synthesized form of the behavior of the workloads 220. In some embodiments, the behavior of the workloads 220 is first put into the compact telemetry stream format (by the telemetry collector 212) and is then further synthesized into a synthesized telemetry stream with minimal flows between the entities.

In some embodiments, the telemetry collector 212 only collects the compact behaviors (for example, SysFlow behaviors) of the workloads 220. In some embodiments, each workload 220 may have a separate behavior stream and a separate security policy for that specific workload (222, 224, or 226). In some embodiments, there is a single security policy for the entire container, therefore the behavior of the workloads 220 (if there are multiple workloads on a single container) may be consolidated into a single behavior stream.

The telemetry collector 212 sends the behavior stream(s) (for example, SysFlow streams or another form of a compact behavior stream), to the intrusion detector 215. In some embodiments, the telemetry collector 212 continuously sends SysFlow streams or other behavior streams to the intrusion detector 215. The telemetry collector 212 may send encoded history of the behavior of the workloads 220, in some instances, to the intrusion detector 215 so that the intrusion detector 215 has more information and history of the workloads 220, which may help the intrusion detector 215 better determine whether the workloads 220 are exhibiting malicious behavior. In some embodiments, every time the behavior streams are transmitted to the intrusion detector 215, the MIDS may push a level of static to make sure that the system stays stateful.

The intrusion detector 215 converts the behavior stream (for example, a SysFlow stream or other compact stream) into an effect graph that shows the behavior of the workloads 220 (i.e., a behavior model for the workloads 220). In some embodiments, the intrusion detector 215 converts the security policy (received from the model system 205) into an effect graph of the expected behavior of the workloads 220 (i.e., a security model for the workloads 220). The security model(s) and the behavior model(s) for the workloads 220 may be compared to determine whether there are any differences, which may indicate that there is malicious behavior. In some embodiments, the results and/or findings are communicated to a user 230. For example, the user 230 may set up a security policy for the MIDS 250 that requires that they be notified any time there is a difference between a security model and a behavior model. In another example, the user 230 may receive weekly reports (or any other time frame) from the intrusion detector that may summarize the findings. In some embodiments, intrusion detector 215 is a security automaton that is self-operating and runs with minimal (to no) manual interference.

Figure 3:
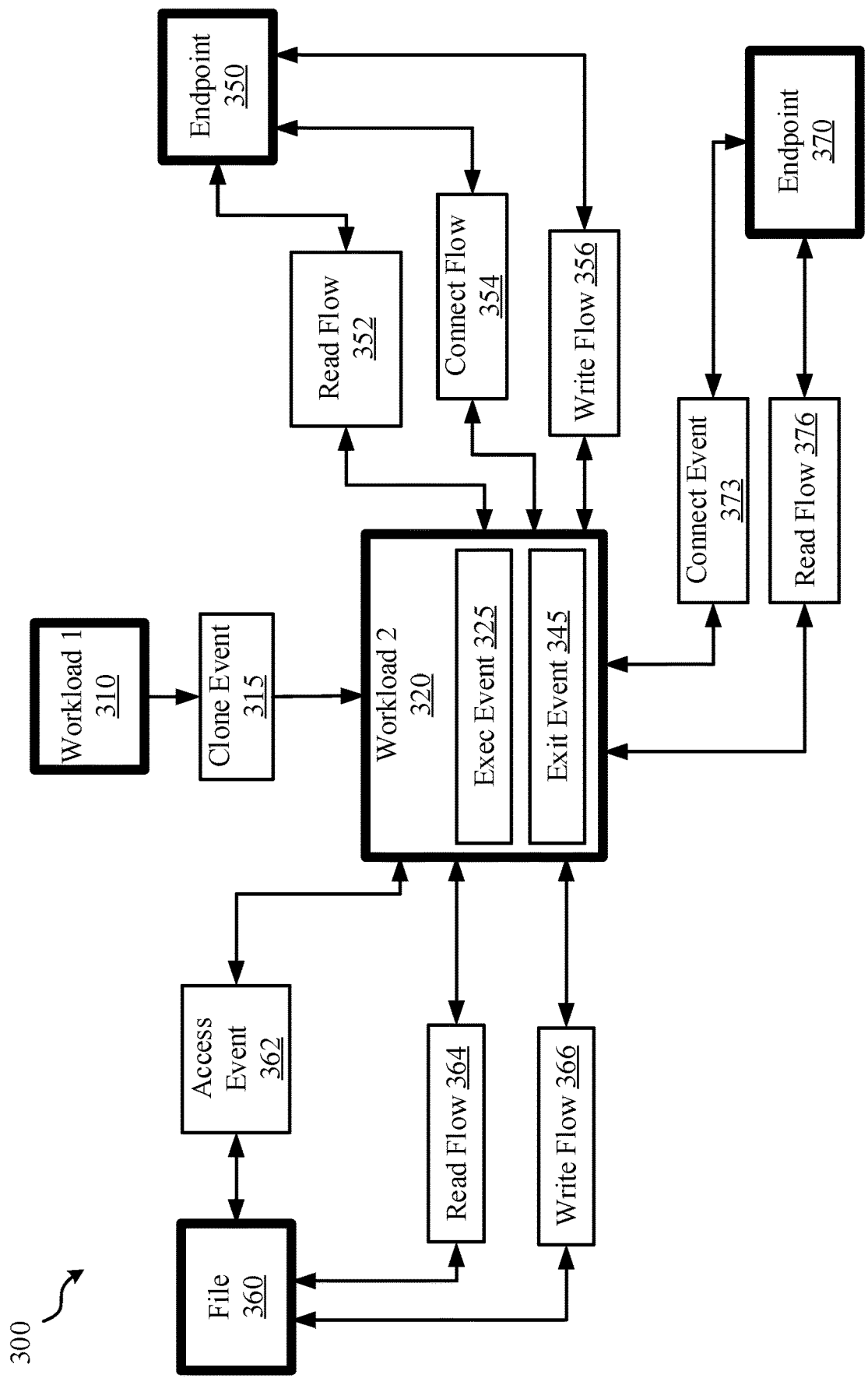
FIG. 3 depicts a block diagram of an example compact telemetry stream, according to some embodiments.

Referring to FIG. 3, a block diagram of an example compact telemetry stream 300 is depicted, according to some embodiments. In some instances, compact telemetry stream 300 may be a SysFlow stream or any other form of condensed/compact behavior stream. Compact telemetry stream 300 is a telemetry stream that shows the behavior of a container that contains workload 1 310 and workload 2 320. In some embodiments, an MIDS (such as MIDS 250 and/or telemetry collector 212 within the MIDS 250 (FIG. 2)) collects the behavior of workload 1 310 and workload 2 320 and converts these behaviors into a compact telemetry stream 300. A compact telemetry stream (such as compact telemetry stream 300) may be a stream that is condensed into a format that focuses on how various processes and operations relate (and less on what times and orders these processes and operations occur). In some instances, compact telemetry stream 300 is a synthesized telemetry (or behavior) stream that is used to generate a behavioral model (such as behavioral model 500 (FIG. 5)). In some embodiments, compact telemetry stream 300 is further synthesized (for example, into synthesized telemetry stream 400 (FIG. 4)) and the synthesized telemetry stream may be used to generate the behavioral model for the container.

In compact telemetry stream 300, workload 1 310 is cloned to become workload 2 320. This cloning operation may only occur once between workload 1 310 and workload 2 320, therefore the cloning operation is represented as clone event 315. Workload 2 320 undergoes an execution (exec) event 325 to begin executing the workload. Workload 2 320 also undergoes an exit event 345 that may close the workload. Because exec event 325 and exit event 345 are events, they may each represent a single operation, in some instances. The behavior of the container is in a compact form, therefore, in some instances, compact telemetry stream 300 may not show at what time, or in what order, the events and flows occur in. For example, workload 1 310 may first clone itself into workload 2 320 then workload 2 320 may undergo the exec event 325. In this example, exit event 345 may be the last operation performed by workload 2 320, however, as the behavior is in a compact form, exec event 325 could occur after exit event 345 and the behavior of the container and the workloads (310 and 320) would still follow the compact telemetry stream 300.

Workload 2 320 interacts with file 360, endpoint 370, and endpoint 350. In some embodiments, workload 1 310, workload 2 320, endpoint 350, file 360, and endpoint 370 are all entities. Workload 2 320 accesses file 360 and also reads and writes to the file 360. In some instances, workload 2 320 only performs an access operation a single time, therefore the access operation is represented as an access event 362. Workload 2 320 may repeatedly read and write from the file 360 (for example, once the file is accessed in access event 362), therefore the read and write operations are represented as read flow 364 and write flow 366.

Workload 2 320 interacts with endpoint 370 through connect and read operations. In some embodiments, a single connect operation may occur to connect workload 2 320 with endpoint 370. Therefore, compact telemetry stream 300 represents the connect operation as connect event 373. There is a read flow 376 between workload 2 320 and endpoint 370, therefore workload 2 320 may repeatedly read from endpoint 370. However, in compact telemetry stream 300, workload 2 320 is not performing any write operations with endpoint 370 as there is no write event or operation between workload 2 320 and endpoint 370.

Workload 2 320 also interacts with endpoint 350. Unlike endpoint 370, workload 2 320 has both read and write access to endpoint 350 and repeatedly reads and writes to endpoint 350. This is represented by read flow 352 and write flow 356. Additionally, there is a connect flow 354 between workload 2 320 and endpoint 350, representing repeated connect operations where workload 2 320 connects to endpoint 350. For example, there may be five connect operations, nine read operations, and four write operations between workload 2 320 and endpoint 350.

Figure 4:
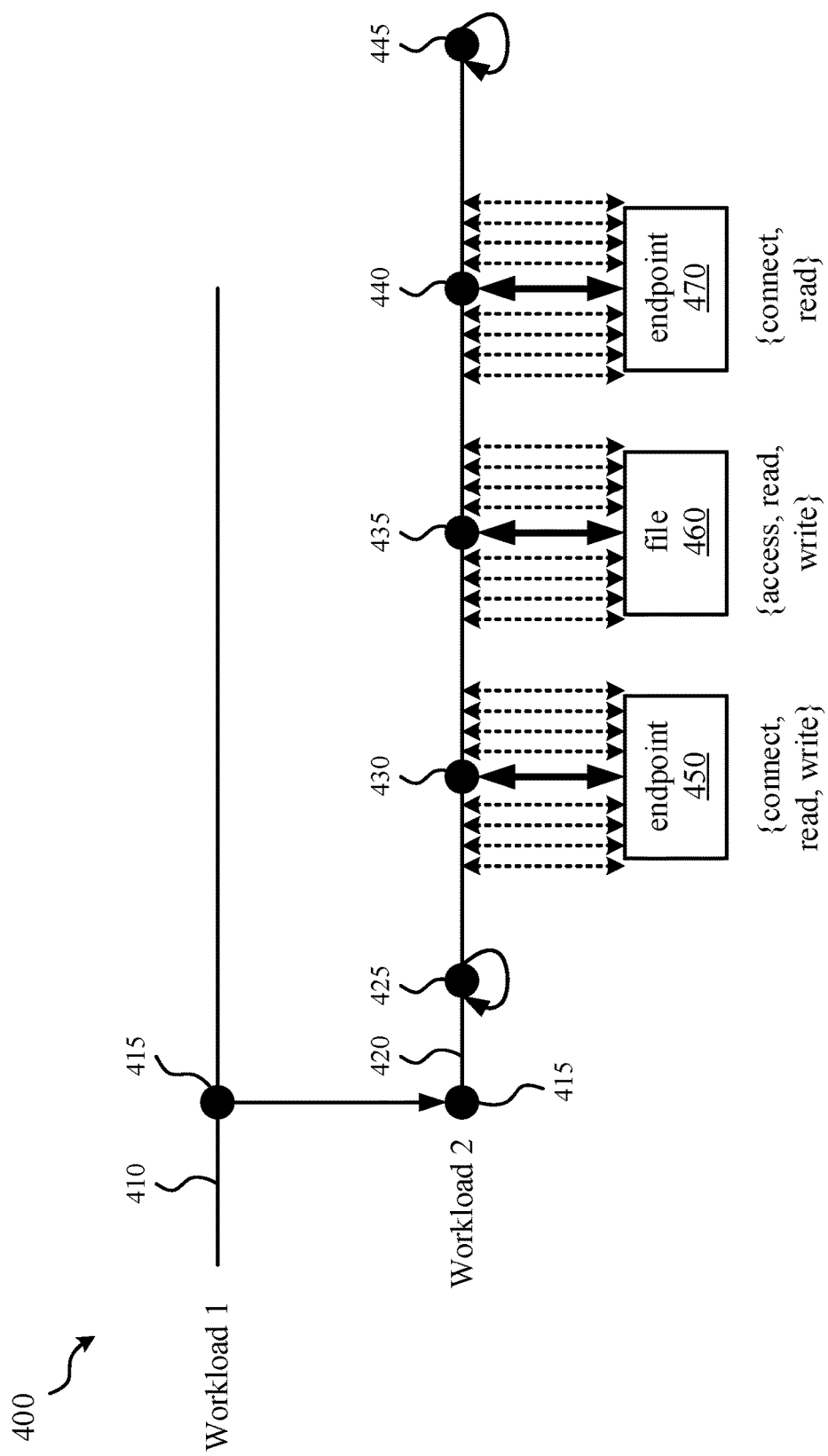
FIG. 4 depicts a schematic diagram of a synthesized telemetry stream, according to some embodiments.
Figure 5:
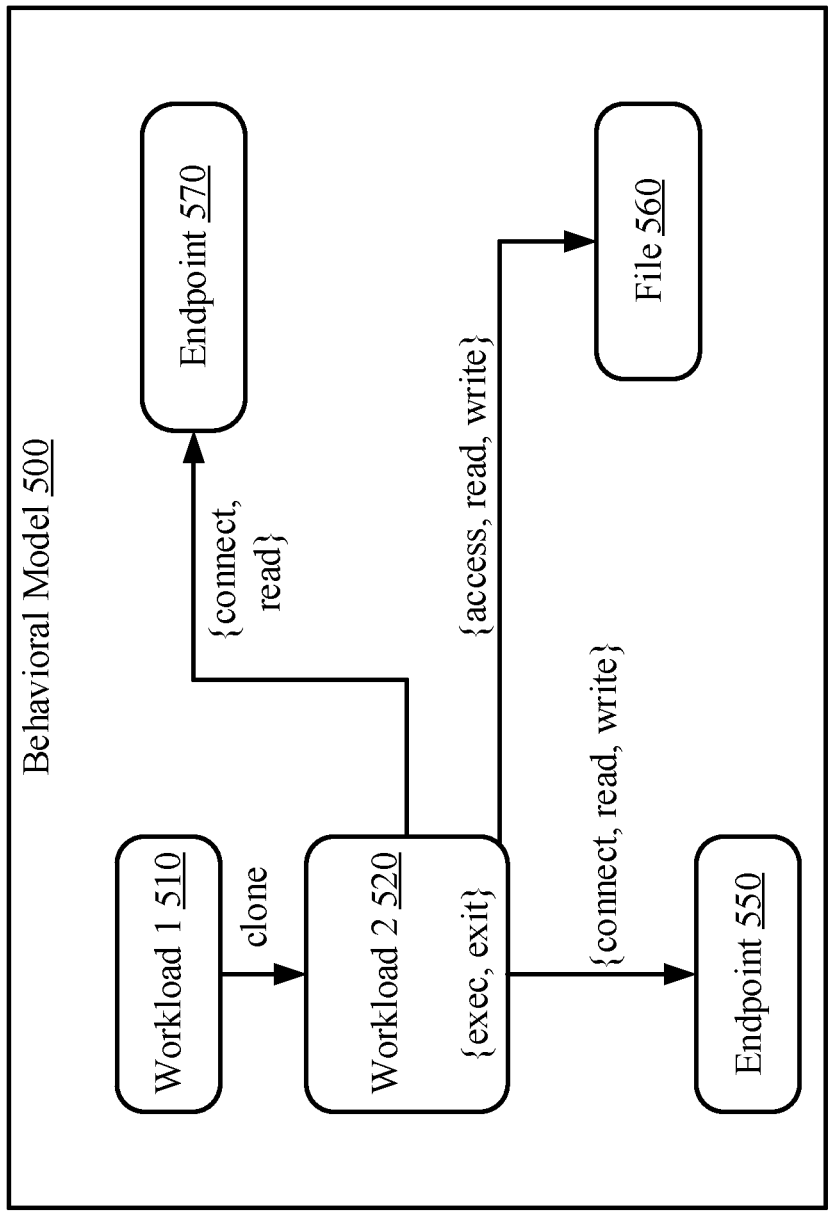
FIG. 5 depicts a schematic diagram of an example behavioral model, according to some embodiments.

Referring to FIG. 4, a schematic diagram of a synthesized telemetry stream 400 is depicted, according to some embodiments. In some embodiments, compact telemetry stream 300 is further synthesized into synthesized telemetry stream 400 and synthesized telemetry stream 400 is used to create a behavioral model (such as behavioral model 500 (FIG. 5). In some embodiments, synthesized telemetry stream 400 is a second example compact or synthesized behavior stream for the same behaviors depicted in FIG. 3.

Synthesized telemetry stream 400 includes workload 1 and workload 2 that are within a container. The behaviors of these workloads may be converted into an effect graph to show the behavior model for the container. Synthesized telemetry stream 400 includes a telemetry stream 410 for workload 1 and a telemetry stream 420 for workload 2. Telemetry streams 410 and 420 may be SysFlow streams or any other form of telemetry stream. In some embodiments, workload 1 and workload 2 correspond to workload 1 310 and workload 2 320, endpoint 450 corresponds to endpoint 350, file 460 corresponds to file 360, and endpoint 470 corresponds to endpoint 370 (FIG. 3).

In some embodiments, at event 415, workload 1 is cloned to become workload 2, and workload 1 may not include any other behaviors or interactions after it has been cloned into workload 2. Therefore, the telemetry stream 410 for workload 1 may simply include the cloning event 415 of workload 1. The behavior of workload 2 may begin once workload 2 is created at cloning event 415. Once workload 2 is created, workload 2 may undergo an execution (exec) event 425 to begin executing workload 2. Workload 2 may have repeated network interactions with an endpoint 450. Although there are multiple interactions between the workload 2 and the endpoint 450, the interactions are synthesized into a single network flow 430. Additionally, these interactions (or operations) that are synthesized into network flow 430 include connect, read, and write interactions. In some instances, as depicted in FIG. 3, there may be multiple connect operations (represented by a connect flow 354), multiple read operations (represented by a read flow 352), and multiple write operations (represented by a write flow 356). In synthesized telemetry stream 400, these operations are consolidated into a single network flow 430 that represents the connect, read, and write operations.

Similarly, workload 2 has repeated interactions with a file 460. These interactions include access, read, and write operations that are synthesized into a single file flow 435. In some embodiments, the access, read, and write operations may correspond to access event 362, read flow 364, and write flow 366 (FIG. 3), respectively. Synthesized telemetry stream 400 may include a further consolidated telemetry stream (when compared to compact telemetry stream 300 (FIG. 3)) as all of the access, read, and write operations are consolidated into a single file flow 435 with no indication of how many times each operation occurs. The interactions between workload 2 and endpoint 470, which include connect and read interactions (or operations), are also synthesized into a single network flow 440. The connect and read interactions may correspond to connect event 373 and read flow 376 (FIG. 3).

At exit event 445, workload 2 is closed. When synthesizing telemetry stream 420, the repeated interactions between the workload and endpoint 450, file 460, and endpoint 470 are all consolidated into single flows for each entity. Therefore, synthesized telemetry stream 420 includes a cloning event 415, an exec event 425, a network flow 430 with endpoint 450, a file flow 435 with file 460, a network flow 440 with endpoint 470, and an exit event 445. This helps simplify the behaviors of the workloads (and the container) so that the system does not have to check for every single exchange between entities (for example, workload 2 and endpoint 450), but so the system can still have enough information about the interactions between the entities so that it can determine if the workload and/or container is behaving abnormally.

As discussed herein, in order to simplify the comparison of the expected behaviors of a container and the actual behavior of the container, the expected and actual behaviors are converted into a succinct structure such as an effect graph in order to demonstrate the behaviors of the container. In some embodiments, the effect graph includes edges that represent the events and flows of the container and vertices that represent the entities. For example, for workload 2, workload 1, endpoint 450, file 460, and endpoint 470 may all be represented by vertices. The interactions between these entities (i.e., cloning event 450, exec event 425, network flow 430, file flow 435, network flow 440, and exit event 445) may all be represented by edges in an effect graph showing the behavior of workload 2.

Referring to FIG. 5, a schematic diagram of an example behavioral model 500 is depicted, according to some embodiments. Behavioral model 500 is an effect graph of the actual behavior of a container (and its contained workloads 1 and 2) as depicted in FIG. 3 and FIG. 4. Behavior model 500 may be generated using compact telemetry stream 300 (FIG. 3) and/or synthesized telemetry stream 400 (FIG. 4). The interactions of the container may be between five entities, workload 1 510, workload 2 520, endpoint 550, file 560, and endpoint 570. As discussed herein, the behavioral model 500 for the container may not include an order of operations, a number of times that each operation occurs, etc. This may help simplify the comparison of the behavioral model 500 (i.e., the effect graph of the actual behavior of the container) and the security model (i.e., the effect graph of the expected behavior of the container).

In some embodiments, workload 1 510 corresponds to workload 1 310 (FIG. 3) and/or workload 1 (FIG. 4), workload 2 520 corresponds to workload 2 320 (FIG. 3) and/or workload 2 (FIG. 4), endpoint 550 corresponds to endpoint 350 (FIG. 3) and/or endpoint 450 (FIG. 4), file 560 corresponds to file 360 (FIG. 3) and/or file 460 (FIG. 4), and endpoint 570 corresponds to endpoint 370 (FIG. 3) and/or endpoint 470 (FIG. 4).

In behavioral model 500, the cloning operation (e.g., clone event 315 (FIG. 3) and/or cloning event 415 (FIG. 4)) is represented by a single flow with a cloning operation between workload 1 510 and workload 2 520. The exec and exit events (e.g., exec event 325 and/or exec event 425, and exit event 345 and/or exit event 445) are represented by exec and exit operations performed by workload 2 520, without including details of when or how many times each operation occurs. The read flow 352, connect flow 354, and write flow 356 between workload 2 320 and endpoint 350 (FIG. 3) and/or the network flow 430 with connect, read, and write operations between workload 2 and endpoint 450 (FIG. 4) are converted into a single flow between workload 2 520 and endpoint 550 with connect, read, and write operations in behavioral model 500. Access event 362, read flow 364, and write flow 366 (FIG. 3) and/or file flow 435 with access, read, and write operations may be converted into a flow between workload 2 520 and file 560 with access, read, and write operations in behavioral model 500. Lastly, connect event 373 and read flow 376 (FIG. 3) and/or network flow 440 with connect and read operations (FIG. 4) may be converted into a flow between workload 2 520 and endpoint 570 with connect and read operations. As discussed herein, although (as depicted in FIG. 3) there may be a single connect operation and multiple read operations between workload 2 520 and endpoint 570, these operations are simplified into a single flow.

Behavioral model 500 is a compact and condensed form of the behavior of a container that simply shows that workload 1 510 is cloned into workload 2 520; workload 2 520 performs exec and exit operations; workload 2 520 interacts with endpoint 550 via connect, read, and write operations; workload 2 520 interacts with file 560 via access, read, and write operations; and workload 2 520 interacts with endpoint 570 via connect and read operations.

Figure 6:
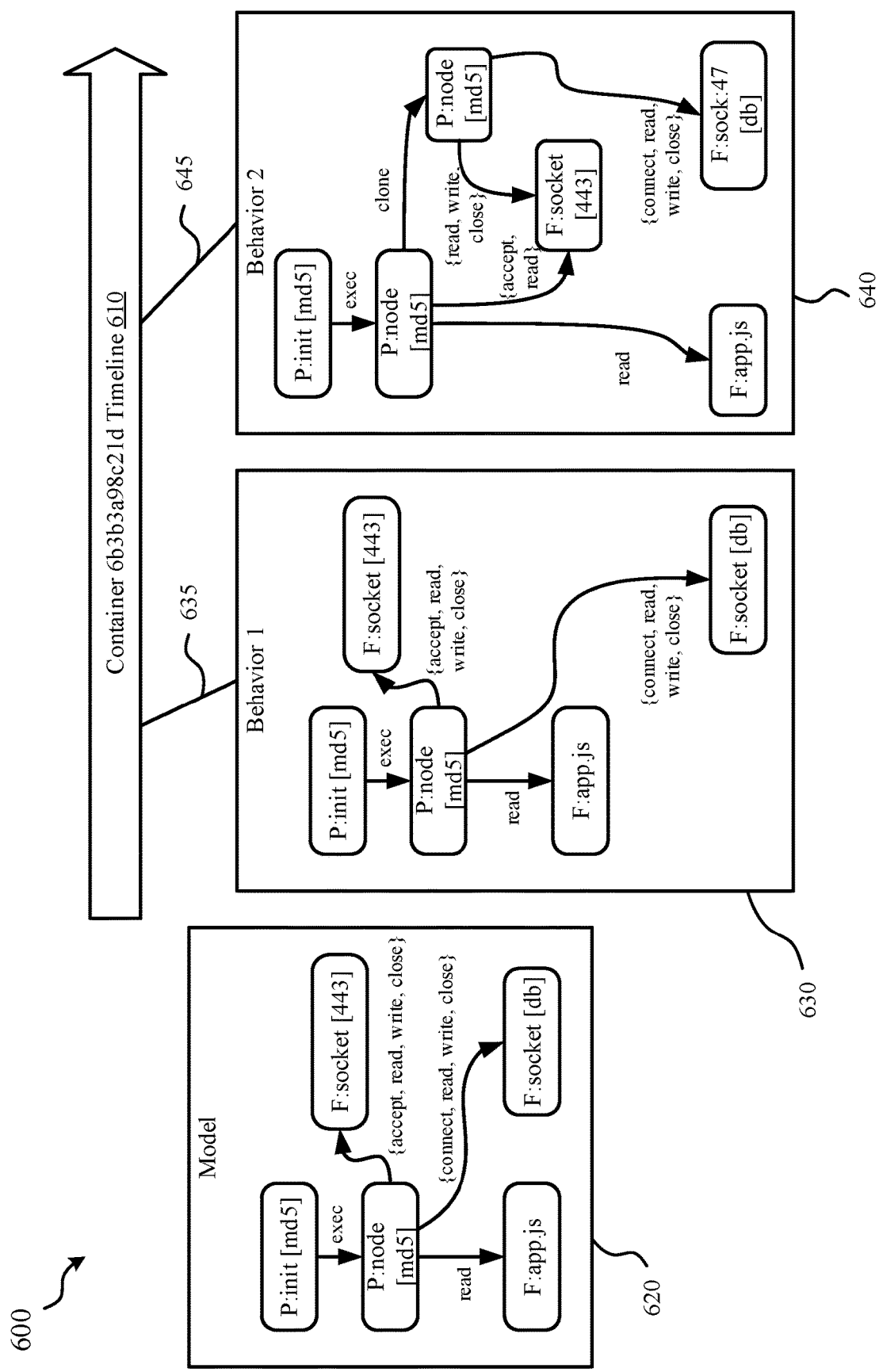
FIG. 6 depicts a schematic diagram of an example container monitoring environment, according to some embodiments.

Referring now to FIG. 6, a schematic diagram of an example container monitoring environment 600 is depicted, according to some embodiments. Container monitoring environment 600 includes a security model 620, a first behavior model 630, and a second behavior model 640 for a container 6b3b3a98c21d. The first behavior model 630 was at a first time 635 on container 6b3b3a98c21d timeline 610 and the second behavior model 640 was at a second time 645 on container 6b3b3a98c21d timeline 610 (for example, after the first time 635). In some embodiments, security model 620 may have been generated at operation 110 (FIG. 1), first behavior model 630 may have been generated at operation 120 (FIG. 1), and second behavior model 640 may have been generated at a repeat execution of operation 120 (FIG. 1).

In container monitoring environment 600, security model 620 is an effect graph of the expected behavior (e.g., security policy) of container 6b3b3a98c21d. Security model 620 includes 5 entities—an initialized process (P:init [md5]), a node (P:node [md5]), an application (F:app.js), and two sockets (F:socket [443] and F:socket [db]). The expected behavior of container 6b3b3a98c21d (shown in security model 620) is for the initialized process to interact with the node through an exec operation, the node to interact with the application through a read operation, the node to interact with socket [db] through connect, read, write, and/or close operations, and the node to interact with socket [443] through accept, read, write, and/or close operations. Because the expected behavior of the container may have been synthesized prior to creating the security model 620 effect graph, the operations between entities (for example, the exec, read, accept, connect, write, and close operations) may be events or flows. Put differently, the operations could be single time operations or repeated operations between the entities. Therefore, for example, the exec operation between the initialized process and the node could either be a single operation or a repeated operation, and either a single operation or a repeated operation may be considered conforming with the security model 620, in some instances.

First behavior model 630 is an effect graph of the behavior of container 6b3b3a98c21d at time 635. In some embodiments, first behavior model 630 is created, or generated, using a synthesized telemetry flow (such as telemetry stream 410 and/or 420 (FIG. 4)). In container monitoring environment 600, first behavior model 630 has no differences from the security model 620, therefore container 6b3b3a98c21d conforms with its expected behavior at time 635.

Second behavior model 620 is an effect graph of the behavior of container 6b3b3a98c21d at time 645. In second behavior model 620, entities such as the initialization process (P:init [md5]), the original node (P:node [md5]), the application (F:app.js), and one of the sockets (F:socket [443]) are consistent with the security model 620. Additionally, the exec operation between the process and the node and the read operation between the node and the application are consistent with (i.e., not different from) the security model 620. Further, although there are only accept and read operations between the original node and the socket [443], the security model 620 indicates that accept, read, write, and close operations are all acceptable operations between the two entities, therefore the interactions between the node and socket [443] in second behavior model 640 are also consistent with the security model 620.

Unlike security model 620, second behavior model 640 includes a cloned node, a cloning operation between the nodes, interactions between the cloned node and socket [443], and a slightly different second socket (F:sock:47 [db], as opposed to F:socket [db] from security model 620). Therefore, the second behavior model 640 is different from the security model at 620, and there could be a virus or other malicious behavior in container 6b3b3a98c21d at time 645.

In some embodiments, the behavior of container 6b3b3a98c21d is being continuously monitored, and first behavior model 630 and second behavior model 640 are two example behavior models at two separate instances (635 and 645) of reference policy checking. There may be continuous behavior models being generated and compared to security model 620 for container 6b3b3a98c21d.

Figure 7:
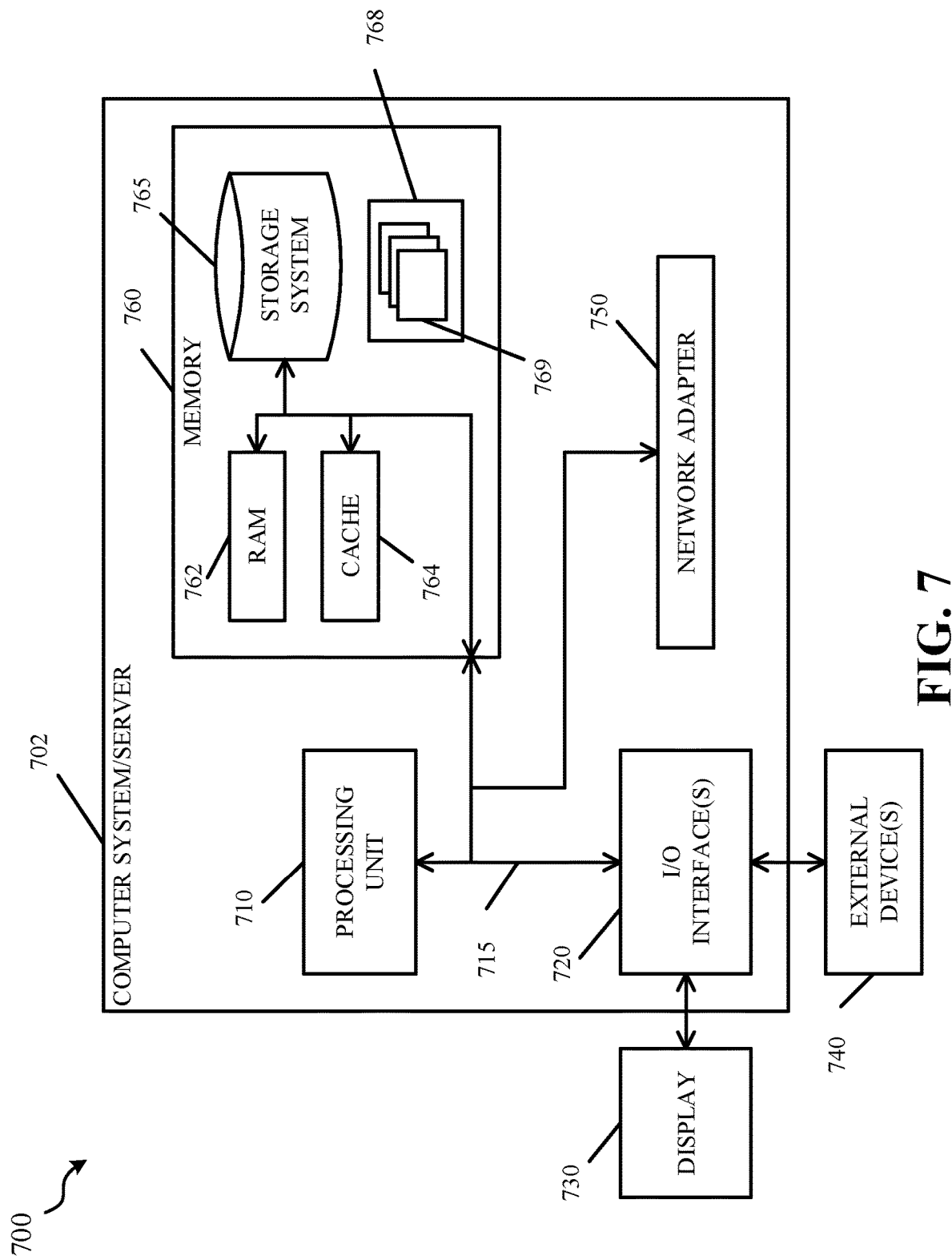
FIG. 7 depicts a block diagram of an example computer system environment, according to some embodiments.

Referring to FIG. 7, computer system 700 is a computer system/server 702 is shown in the form of a general-purpose computing device, according to some embodiments. In some embodiments, computer system/server 702 is located on the linking device. In some embodiments, computer system 702 is connected to the linking device. The components of computer system/server 702 may include, but are not limited to, one or more processors or processing units 710, a system memory 760, and a bus 715 that couples various system components including system memory 760 to processor 710.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 760 can include computer system readable media in the form of volatile memory, such as random-access memory (RAM) 762 and/or cache memory 764. Computer system/server 702 may further include other removable/non-removable, volatile/non-volatile computer system storage media. By way of example only, storage system 765 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 760 may include at least one program product having a set (e.g., at least one) of program modules that are configured to carry out the functions of embodiments of the disclosure.

Program/utility 768, having a set (at least one) of program modules 769, may be stored in memory 760 by way of example, and not limitation, as well as an operating system, one or more application programs, other program modules, and program data. Each of the operating system, one or more application programs, other program modules, and program data or some combination thereof, may include an implementation of a networking environment. Program modules 769 generally carry out the functions and/or methodologies of embodiments of the invention as described herein.

Computer system/server 702 may also communicate with one or more external devices 740 such as a keyboard, a pointing device, a display 730, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 720. Still yet, computer system/server 702 can communicate with one or more networks such as a local area network (LAN), a general wide area network (WAN), and/or a public network (e.g., the Internet) via network adapter 750. As depicted, network adapter 750 communicates with the other components of computer system/server 702 via bus 715. It should be understood that although not shown, other hardware and/or software components could be used in conjunction with computer system/server 702. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
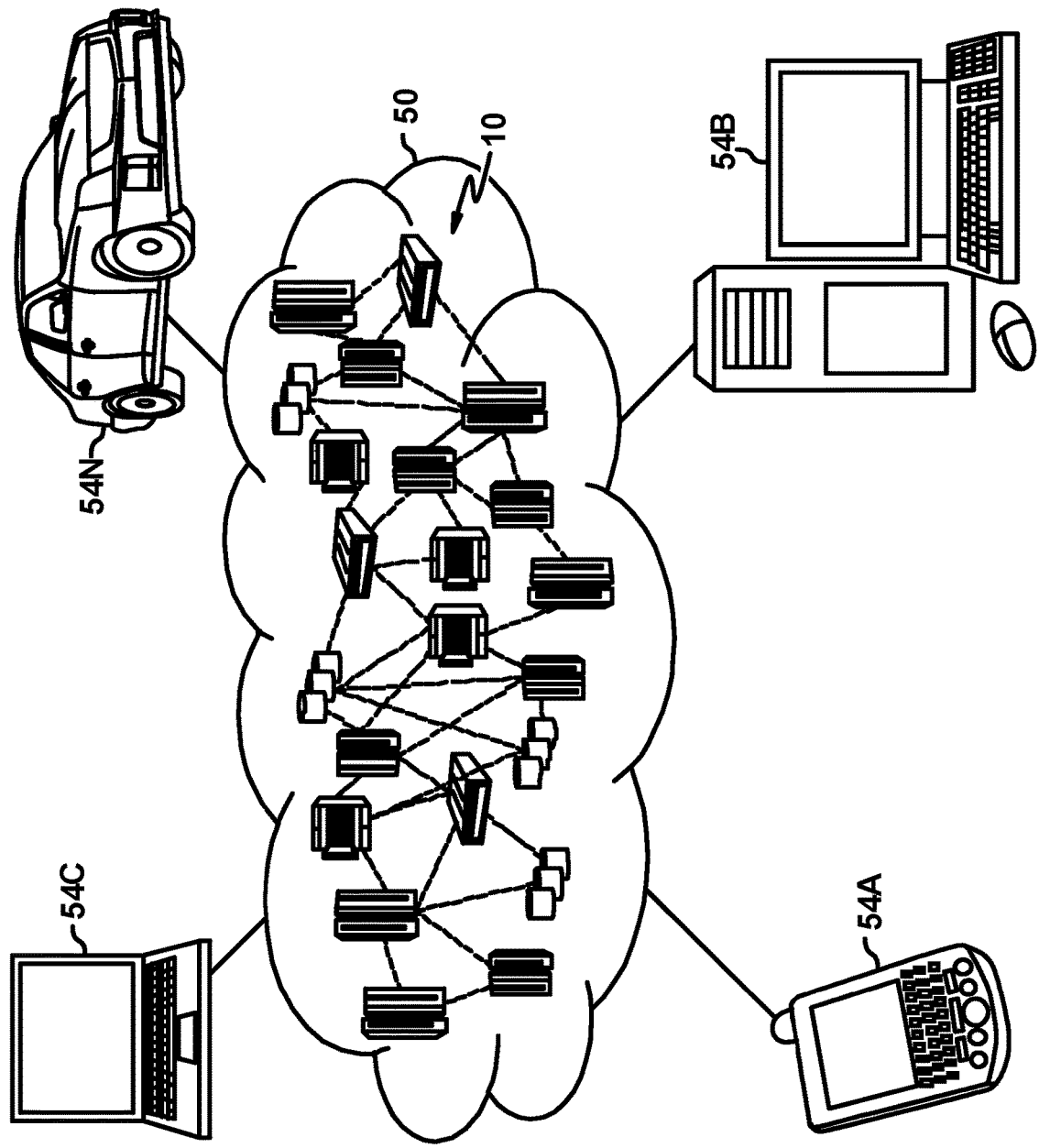
FIG. 8 depicts a cloud computing environment, according to some embodiments.

Referring now to FIG. 8, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
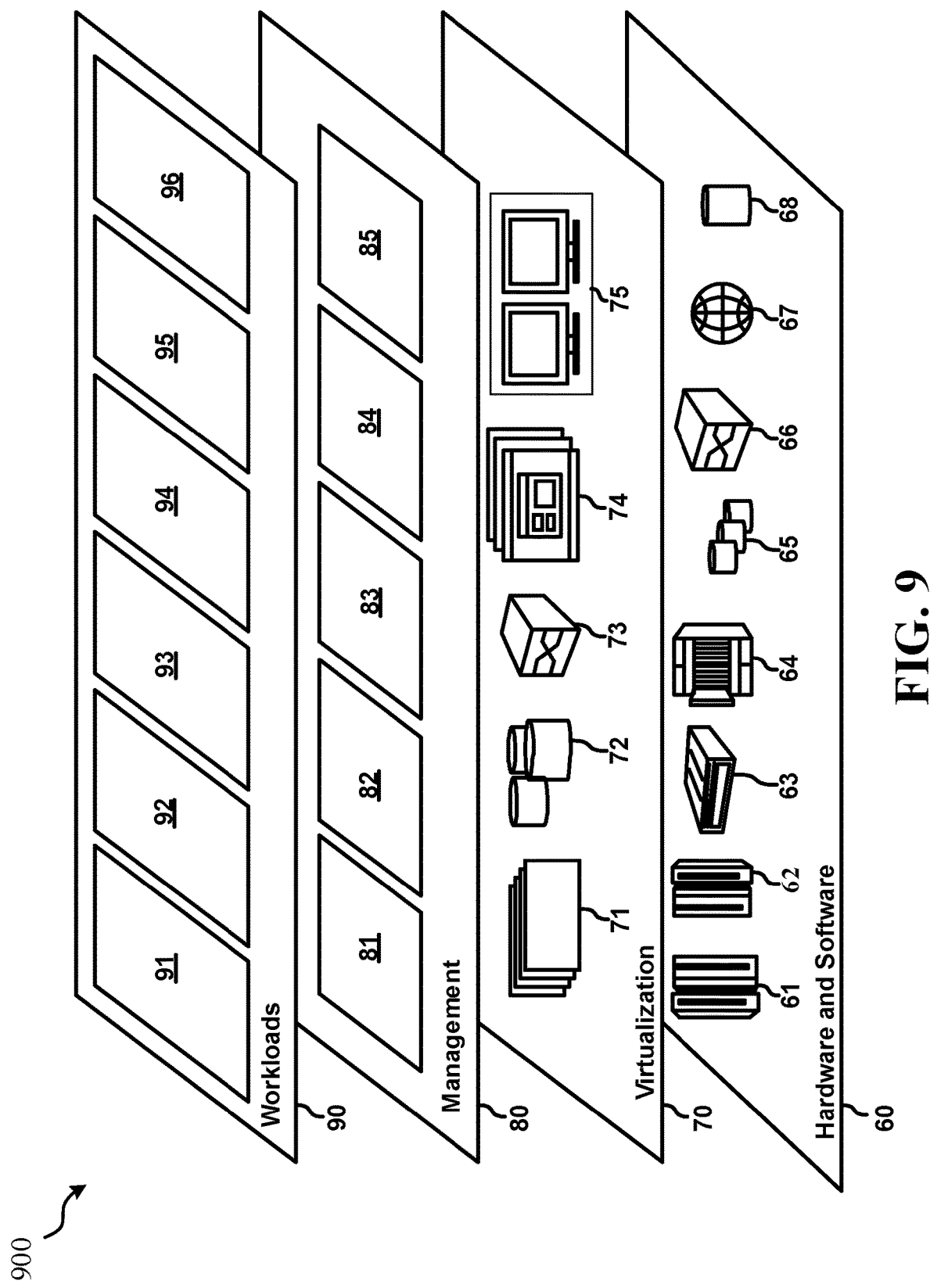
FIG. 9 depicts abstraction model layers, according to some embodiments.

Referring now to FIG. 9, a set of functional abstraction layers 900 provided by cloud computing environment 50 (FIG. 8) is shown, according to some embodiments. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intrusion detection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a security policy for a container that is part of a microservice architecture;
obtaining a first effect graph of the security policy, resulting in a security model for the container;
identifying execution behavior of the container;
generating a second effect graph of the execution behavior of the container, wherein the generating comprises summarizing operations and interactions between entities in the execution behavior and results in a behavioral model for the container;
comparing the behavioral model to the security model;
determining whether the container has deviated from the security policy based on the comparing; and
enforcing the security policy against the container.

2. The method of claim 1, wherein summarizing the operations and interactions between the entities in the execution behavior comprises:
receiving a telemetry stream of the execution behavior of the container, wherein the telemetry stream records behavior of entities, events, and flows of the container;
synthesizing the telemetry stream into one or more flows between the entities; and
generating a succinct structure of the one or more flows, resulting in the second effect graph.

3. The method of claim 2, wherein the synthesizing the telemetry stream into the small amount of flows between the entities further comprises:
consolidating the events and the flows between same entities into a single flow.

4. The method of claim 2, wherein the telemetry stream is a SysFlow stream.

5. The method of claim 1, wherein the second effect graph comprises:
unordered compact flows between the entities representing the operations and interactions of the container.

6. The method of claim 1, wherein obtaining the first effect graph of the security policy, resulting in the security model for the container comprises:
transforming the security policy into the security model, wherein the security model is the first effect graph of the security policy.

7. The method of claim 1, wherein transforming the security policy into the security model for the container comprises:
identifying expected entities, expected events, and expected flows of the container from the security policy;
synthesizing the expected entities, the expected events, and the expected flows; and
generating the first effect graph from the synthesized expected entities, expected events, and expected flows of the container.

8. The method of claim 1, further comprising:
determining that the container has not deviated from the security policy;
identifying second execution behavior of the container at a second time period;
generating a third effect graph of the second execution behavior, resulting in a second behavioral model for the container; and
comparing the second behavioral model to the security model.

9. The method of claim 8, further comprising:
determining that the second behavioral model is different than the security model; and
determining that the container has deviated from the security policy at the second time period.

10. The method of claim 1, wherein, in response to determining that the container has not deviated from the security policy, enforcing the security policy comprises:
marking the container as conforming with the security policy.

11. The method of claim 1, wherein, in response to determining that the container has deviated from the security policy, enforcing the security policy comprises:
flagging the container as having potentially malicious behavior;
determining which behaviors from the behavior model are different from the security policy; and
pausing execution of the container.

12. A system having one or more computer processors, the system configured to:
receive a security policy for a container that is part of a microservice architecture;
obtain a first effect graph of the security policy, resulting in a security model for the container;
identify execution behavior of the container;
generate a second effect graph of the execution behavior of the container, wherein the generating comprises summarizing operations and interactions between entities in the execution behavior and results in a behavioral model for the container;
compare the behavioral model to the security model;
determine whether the container has deviated from the security policy based on the comparing; and
enforce the security policy against the container.

13. The system of claim 12, wherein summarizing the operations and interactions between the entities in the execution behavior comprises:
receiving a telemetry stream of the execution behavior of the container, wherein the telemetry stream records behavior of entities, events, and flows of the container;
synthesizing the telemetry stream into one or more flows between the entities; and
generating a succinct structure of the one or more flows, resulting in the second effect graph.

14. The system of claim 12, wherein transforming the security policy into the security model for the container comprises:
identifying expected entities, expected events, and expected flows of the container from the security policy;
synthesizing the expected entities, the expected events, and the expected flows; and
generating the first effect graph from the synthesized expected entities, expected events, and expected flows of the container.

15. The system of claim 12, wherein obtaining the first effect graph of the security policy, resulting in the security model for the container comprises:
transforming the security policy into the security model, wherein the security model is the first effect graph of the security policy.

16. The system of claim 12, further configured to:
determine that the container has not deviated from the security policy;
identify second execution behavior of the container at a second time period;
generate a third effect graph of the second execution behavior, resulting in a second behavioral model for the container; and compare the second behavioral model to the security model.

17. A computer program product comprising a computer readable storage medium having program instructions embodied therewith, the program instructions executable by a server to cause the server to perform a method, the method comprising:
receiving a security policy for a container that is part of a microservice architecture;
obtaining a first effect graph of the security policy, resulting in a security model for the container;
identifying execution behavior of the container;
generating a second effect graph of the execution behavior of the container, wherein the generating comprises summarizing operations and interactions between entities in the execution behavior and results in a behavioral model for the container;
comparing the behavioral model to the security model;
determining whether the container has deviated from the security policy based on the comparing; and
enforcing the security policy against the container.

18. The computer program product of claim 17, wherein summarizing the operations and interactions between the entities in the execution behavior comprises:
receiving a telemetry stream of the execution behavior of the container, wherein the telemetry stream records behavior of entities, events, and flows of the container;
synthesizing the telemetry stream into one or more flows between the entities; and
generating a succinct structure of the one or more flows, resulting in the second effect graph.

19. The computer program product of claim 17, wherein transforming the security policy into the security model for the container comprises:
identifying expected entities, expected events, and expected flows of the container from the security policy;
synthesizing the expected entities, the expected events, and the expected flows; and
generating the first effect graph from the synthesized expected entities, expected events, and expected flows of the container.

20. The computer program product of claim 17, further comprising:
determining that the container has not deviated from the security policy;
identifying second execution behavior of the container at a second time period;
generating a third effect graph of the second execution behavior, resulting in a second behavioral model for the container; and
comparing the second behavioral model to the security model.

* * * * *